United States Patent
Boonekamp et al.

(10) Patent No.: US 10,816,149 B2
(45) Date of Patent: Oct. 27, 2020

(54) CUSTOMIZABLE 3D-PRINTED LIGHTING DEVICE

(71) Applicant: SIGNIFY HOLDING B.V., Eindhoven (NL)

(72) Inventors: Erik Paul Boonekamp, Eindhoven (NL); Rifat Ata Mustafa Hikmet, Eindhoven (NL); Paulus Albertus Van Hal, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 282 days.

(21) Appl. No.: 16/066,752

(22) PCT Filed: Dec. 21, 2016

(86) PCT No.: PCT/EP2016/082173
§ 371 (c)(1),
(2) Date: Jun. 28, 2018

(87) PCT Pub. No.: WO2017/114720
PCT Pub. Date: Jul. 6, 2017

(65) Prior Publication Data
US 2019/0011095 A1 Jan. 10, 2019

(30) Foreign Application Priority Data

Dec. 29, 2015 (EP) .................................... 15202924

(51) Int. Cl.
*F21S 8/02* (2006.01)
*F21V 9/30* (2018.01)
(Continued)

(52) U.S. Cl.
CPC ............. *F21S 8/026* (2013.01); *B29C 64/118* (2017.08); *B33Y 80/00* (2014.12); *F21S 8/04* (2013.01);
(Continued)

(58) Field of Classification Search
CPC . B29C 64/118; B29L 2031/747; B33Y 10/00; B33Y 80/00; F21S 8/04;
(Continued)

(56) References Cited

U.S. PATENT DOCUMENTS

| 6,760,084 B2 * | 7/2004 | Cole ...................... G09F 13/04 349/114 |
| 2004/0085749 A1 * | 5/2004 | Parker ............... G02F 1/133555 362/601 |

(Continued)

FOREIGN PATENT DOCUMENTS

| CN | 103687715 A | 3/2014 |
| CN | 103913798 A | 7/2014 |

(Continued)

*Primary Examiner* — Carl J Arbes
(74) *Attorney, Agent, or Firm* — Akarsh P. Belagodu (57) ABSTRACT

The invention provides lighting device (1000) configured to provide a beam of lighting device light (1001), the lighting device (1000) comprising: (a) a light transmissive window (100) having a first window side (101) and a second window side (102); (b) a reflector (200) comprising a reflector cavity (210), the reflector cavity (210) comprising a first reflector cavity side (201), a reflector cavity exit side (202), a reflector cavity wall (205) bridging said first reflector cavity side (201) and said reflector cavity exit side (202); wherein the reflector cavity wall (205) comprises a light reflective material (206), wherein the recavity wall (205) comprises a 3D-printed cavity wall (1205); wherein at least part of the first window side (101) is configured as reflector cavity exit window (220) at the reflector cavity exit side (202); (c) a light source (10) configured at the first reflector cavity side (201) and configured to provide light source light (11) within said reflector cavity (210); and (d) a beam modifying element (300) configured at the first window side (201)

(Continued)

within the reflector cavity (210), wherein the beam modifying element (300) comprises a 3D-printed beam modifying element (1300).

10 Claims, 8 Drawing Sheets

(51) Int. Cl.
| | |
|---|---|
| *F21V 3/12* | (2018.01) |
| *F21V 3/06* | (2018.01) |
| *F21V 3/04* | (2018.01) |
| *B33Y 80/00* | (2015.01) |
| *F21S 8/04* | (2006.01) |
| *F21V 7/04* | (2006.01) |
| *B29C 64/118* | (2017.01) |
| *F21V 7/24* | (2018.01) |
| *F21Y 115/10* | (2016.01) |
| *B33Y 10/00* | (2015.01) |
| *B29L 31/00* | (2006.01) |

(52) U.S. Cl.
CPC .............. *F21V 3/049* (2013.01); *F21V 3/062* (2018.02); *F21V 3/12* (2018.02); *F21V 7/04* (2013.01); *F21V 7/24* (2018.02); *F21V 9/30* (2018.02); *B29L 2031/747* (2013.01); *B33Y 10/00* (2014.12); *F21Y 2115/10* (2016.08)

(58) Field of Classification Search
CPC .......... F21S 8/026; F21V 3/049; F21V 3/062; F21V 3/12
See application file for complete search history.

(56) References Cited

U.S. PATENT DOCUMENTS

| | | | |
|---|---|---|---|
| 2009/0073570 A1* | 3/2009 | Lubart | .............. G02F 1/133605 359/641 |
| 2013/0134445 A1 | 5/2013 | Tarsa et al. | |
| 2013/0294075 A1* | 11/2013 | Cornelissen | .......... F21V 7/0083 362/235 |
| 2015/0021628 A1 | 1/2015 | Medendorp, Jr. et al. | |

FOREIGN PATENT DOCUMENTS

| | | | |
|---|---|---|---|
| CN | 104684715 A | | 6/2015 |
| EP | 0833237 A2 | | 4/1998 |
| EP | 1355108 A2 | | 10/2003 |
| EP | 2924351 A1 | | 9/2015 |
| WO | 2012/138898 A1 | * | 10/2012 |
| WO | 2014147505 A1 | | 9/2014 |
| WO | 2015000716 A1 | | 1/2015 |

* cited by examiner

CUSTOMIZABLE 3D-PRINTED LIGHTING DEVICE

CROSS-REFERENCE TO PRIOR APPLICATIONS

This application is the U.S. National Phase application under 35 U.S.C. § 371 of International Application No. PCT/EP2016/082173, filed on Dec. 21, 2016, which claims the benefit of European Patent Application No. 15202924.5, filed on Dec. 29, 2015. These applications are hereby incorporated by reference herein.

FIELD OF THE INVENTION

The invention relates to a method for producing a lighting device.

BACKGROUND OF THE INVENTION

Fused deposition modelling (FDM) is known in the art. EP0833237 describes for instance an apparatus incorporating a movable dispensing head provided with a supply of material which solidifies at a predetermined temperature, and a base member, which are moved relative to each other along "X", "Y," and "Z" axes in a predetermined pattern to create three-dimensional objects by building up material discharged from the dispensing head onto the base member at a controlled rate. The apparatus is preferably computer driven in a process utilizing computer aided design (CAD) and computer-aided (CAM) software to generate drive signals for controlled movement of the dispensing head and base member as material is being dispensed. Three-dimensional objects may be produced by depositing repeated layers of solidifying material until the shape is formed. Any material, such as self-hardening waxes, thermoplastic resins, molten metals, two-part epoxies, foaming plastics, and glass, which adheres to the previous layer with an adequate bond upon solidification, may be utilized. Each layer base is defined by the previous layer, and each layer thickness is defined and closely controlled by the height at which the tip of the dispensing head is positioned above the preceding layer.

SUMMARY OF THE INVENTION

Downlights (or downlighters) are used in "confined spaces", such as hallways or corridors, where illumination of walls and/or the floor may be equally important and should in general be carefully balanced. A disadvantage of the current lighting systems is amongst others that currently installed downlighter luminaires ("downlighters") have a (substantially) symmetrical light distribution (while many spaces are not symmetrical). Further, downlighters have a light distribution which is very limitedly customizable, or even not customizable, to the specific properties of a space. Moreover, the architecture of the building, and thus the dimensions and shape of the space, is often completely unique while the installed lighting is "standard".

Hence, it is an aspect of the invention to provide an alternative lighting concept, which preferably further at least partly obviates one or more of above-described drawbacks, and which may especially allow a relative free design of the lighting devices adapted to the space to be (partly) illuminated with the lighting device.

It is herein proposed to use 3D printing to manufacture elements that shape the beam.

The invention provides a lighting device, especially configured to provide a beam of lighting device light (herein also indicated as "beam" or "beam of light"), the lighting device comprising: (a) a light transmissive window ("window") having a first window side and a second window side; (b) a reflector comprising a reflector cavity ("cavity"), the reflector cavity comprising a first reflector cavity side, a reflector cavity exit side, a reflector cavity wall bridging said first reflector cavity side and said reflector cavity exit side; wherein the reflector cavity wall comprises a light reflective material, wherein the reflector cavity wall comprises a 3D-printed cavity wall; wherein at least part of the first window side is configured as reflector cavity exit window at the reflector cavity exit side; (c) a light source configured at the first reflector cavity side and configured to provide light source light within said reflector cavity; and a beam modifying element ("beam modifier" or "modifier"), especially configured at the first window side within the reflector cavity, wherein the beam modifying element comprises a 3D-printed beam modifying element.

3D printing of downlights offers unique design and customization opportunities. Now, one may be able designing almost free-form intensity profiles and create a look and feel with fits to the unique architecture of a new or refurbished building. It also offers opportunities for retrofitting existing lighting systems (i.e. systems based on TL or other conventional light source). This means that is possible to reproduce the intensity profile of a conventional luminaire exactly by a 3D printed lighting system. This invention describes a process to fabricate tailor-made lighting devices, especially downlights. The described technology and embodiments are not limited to downlights but can be applied to e.g. office lighting and high-bay lighting as well. High bays are designed to be used in very high areas (approximately 8 m and higher) to provide well distributed and uniform light for open areas. A particular consideration for use with a high bay is if it can light vertical surfaces as well as it can illuminate the floor, or working plane. With the present invention, also asymmetric light beams may be generated. The lighting device can be completely tailor made to a specific position in a space to illuminate that space or a specific part thereof. Hence, the lighting device is customizable.

The lighting device is configured to provide a beam of lighting device light. This beam propagates from the reflector cavity exit window. The shape of the beam may at least partly be determined by the reflector cavity. The shape of the beam may further be at least partly be determined by the beam modifying element. Further, the shape of the beam may at least partly determined by second beam shaping elements that may optionally be comprised by the reflector cavity exit window. As indicated above, the beam may have a symmetric or asymmetric intensity distribution. Hence, in embodiments the beam of lighting device light has equal to or less than one symmetry plane. The spectral distribution of the lighting device may be substantially equal to the light source light, though optionally at least part of the light source light may be converted with a luminescent material (see also below) and/or part of the spectral distribution of the light source light may be blocked with an optical filter (color filter) (see also below).

As will further elucidated below, to produce the lighting device, a window is used as support to 3D print the reflector cavity and/or beam modifying element. This window that is used as support, is a light transmissive window. Hence, the window material is selected to allow transmission of at least part of the visible light.

The window (material) may comprises one or more materials selected from the group consisting of a transmissive organic material, such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethylene terephthalate (PET), including in an embodiment (PETG) (glycol modified polyethylene terephthalate), PDMS (polydimethylsiloxane), and COC (cyclo olefin copolymer). Especially, the window may comprise an aromatic polyester, or a copolymer thereof, such as e.g. polycarbonate (PC), poly (methyl)methacrylate (P(M)MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN); especially, the window may comprise polyethylene terephthalate (PET). Hence, the window is especially a polymeric window. However, in (other) embodiments the window material may comprise an inorganic material. Preferred inorganic materials are selected from the group consisting of glasses, (fused) quartz, transmissive ceramic materials, and silicones. Also hybrid materials, comprising both inorganic and organic parts may be applied. Especially preferred are PMMA, PET, transparent PC, or glass. Especially, the window is substantially transparent to the light of the light source.

The window may be a plate. In yet other embodiments, the window may be a self-supporting foil. In yet further embodiments, the window comprises a laminate of different materials. For instance, a rigid optical film having a thickness of e.g. 0.3-0.5 mm may in embodiments be applied. Also a thin optical film laminated on a thick plate may be used. Also combinations of two or more of such embodiments may be applied.

Hence, at least part of the visible spectrum may be transmitted from the cavity side, substantially upstream of the window, through the window, to the exterior, downstream from the window. The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

The light transmissive window may especially have a thickness selected from the range of 0.1-20 mm, such as in the range of 0.2-10 mm, like especially in the range of 1-5 mm. Optionally, the thickness may differ over the window.

This light transmissive window, or at least part thereof, thus becomes the reflector cavity exit window. Hence, at least part of the first window side is configured as reflector cavity exit window at the reflector cavity exit side. Therefore, especially the first window side is planar. However, in embodiments the 3D printable material may also be printed on a non-planar first window side (and/or second window side). The second window side, on which no 3D printable material may be printed is not necessarily planar. However, in embodiments the second window side may (also) be planar. In specific embodiments, both window sides may be planar.

The beam modifying element may be 3D printed at the second window side or the first window side. The term "beam modifying element" may also refer to a plurality of (different) beam modifying elements. Hence, the beam modifying element may also be printed at the first window side and the second window side. In specific embodiments, however, the beam modifying element is printed at the first window side, the same side at which the cavity is printed. Hence, especially the beam modifying element is configured at the first window side. Especially, the beam modifying element is a (FDM) 3D printed beam modifying element.

The lighting device further comprises a reflector. The reflector comprises a reflector cavity. The reflector cavity is especially defined by a reflector cavity wall, which especially bridges a first reflector cavity side, at which the light source is arranged, and the reflector cavity exit side, at which the window is arranged. Hence, the reflector cavity may essentially be defined by the reflector cavity wall and the reflector cavity exit window. The light transmissive window is especially configured to close the reflector cavity at the reflector cavity exit side. Thereby, at least part of the light transmissive window is configured as reflector cavity exit window.

The reflector cavity may in principle have substantially any shape, as the lighting device may be configured to provide symmetric beams or asymmetric beams. Hence, the reflector cavity may have a cross-section selected from the group consisting of circular, elliptical, triangular, square, rectangular, pentagonal, hexagonal, and octagonal. However, the cross-section may also have another symmetry or (substantially) no symmetry. In specific embodiments, the reflector cavity has equal to or less than one symmetry plane. Further, the shape of the cross-section may change over the length of the cavity. Hence, with increasing distance from the first reflector cavity side to the second reflector cavity side the dimensions of the cross-section will not only increase, but optionally also the shape of the cross-section may change. Of course, the invention may also be used to provide reflector cavities with a high symmetry. In embodiments, for instance, the reflector cavity may be configured as tapered reflector with a substantially symmetrical tapering, like a cone or trumpet shape. Especially, the cross-section of the reflector cavity increases from the first reflector cavity side to the reflector cavity exit side.

The reflector cavity is (thus) especially configured to shape a beam of light from the light source light (see also below). Hence, the reflector cavity wall comprises light reflective material.

Hence, in embodiments the wall material that is used to create the cavity wall is chosen to be essentially white. Hence, in embodiments the polymeric material (especially thermoplastic material) that is used may comprise a light reflective additive. The light reflective additive may e.g. be chosen from the group consisting of Antimony white (stibous oxide ($Sb_2O_3$), barium sulfate (PW5)), Cremnitz white ((PW1): basic plumbous carbonate ($PbCO_3)_2Pb(OH)_2$)), titanium white)(PW6): titanium oxide ($TiO_2$)), zinc white ((PW4): Zinc Oxide (ZnO)), etc. Other white pigments that may be used as light reflective material may e.g. be selected from the group consisting of MgO, strontium titanate, calcium carbonate, etc., may be applied. Further, also natural materials may be applied, such as powdered egg shells. Also combinations of two or more light reflective additives may be applied. Especially, $TiO_2$ may be relevant.

In yet other embodiments, the reflector cavity wall comprises a light transmissive polymeric material (without pigment additive). Hence, the reflector cavity wall may be transmissive for part of the visible light. In embodiments, the light transmissive polymeric material may substantially be transparent. In yet other embodiments, the light transmissive polymeric material may be translucent. However, due to reflection of the light source light at the reflector wall, the reflector cavity may have its beam shaping functionality.

In yet further embodiments, a light transmissive polymeric material may be applied comprising such light reflective additive. Such embodiments may provide best optical properties as such reflector wall may be essentially white.

In yet other embodiments, the reflector wall may comprise a semi-crystalline polymer (here, a polymer that is semi-crystalline). For instance, the reflector wall may comprise one or more polymers of the semi-crystalline type selected from the group consisting of a polyester, a polyphenylene, and a polystyrene. Especially, polyethylene terephthalate (PET) may be applied. Such semi-crystalline polymers may chance from substantially transparent to translucent upon crystallization (and have reflective properties).

The lighting device further comprises a light source. In a specific embodiment, the light source comprises a solid state (LED) light source (such as a LED or laser diode). The term "light source" may also relate to a plurality of light sources, such as 2-20 (solid state) LED light sources. Hence, the term LED may also refer to a plurality of LEDs. Light from the light source especially propagates in a direction from the first reflector cavity side to the reflector cavity exit side.

Especially, the light source is configured to provide visible light. The terms "visible", "visible light" or "visible emission" refer to light having a wavelength in the range of about 380-780 nm. The light source may be configured to provide white light or colored light. The lighting device may comprise a plurality of light sources and a control system configured to control one or more of the color temperature and color of the light source light generated by the plurality of light sources.

The light source and the reflector are especially configured to provide a beam of light source light. This beam of light may be further modified by the beam modifying element, which is (thus) especially configured at the first window side within the reflector cavity. Light downstream of the reflector cavity exit window is herein especially indicated as "lighting device light" or "beam of lighting device light".

The beam modifying element modifies the light that escapes from the reflector cavity. The modification of the beam may relate to one or more of the light distribution as well as to the spectral light distribution (of the light that escapes from the reflector cavity at the reflector cavity exit side).

In the former embodiment, the shape of beam is (further) tuned, i.e. the reflector may have a beam shaping effect and the beam modifying element further shapes the beam. Hence, in embodiments the beam modifying element comprises a beam shaping element. For instance, the beam modifying element may be used to reduce glare. Hence, in embodiments the beam modifying element comprises a glare reduction element. Hence, the beam modifying element may e.g. reduce the amount of light escaping in a specific direction from the lighting device.

In the latter embodiment, alternatively or additionally the beam modifying element also has an impact on the spectral distribution of the light escaping from the lighting device. For instance, the beam modifying element may include one or more of an optical filter and a luminescent material. The former may be used to block part of the visible spectrum; the latter may be used to convert part of the light source light into (visible) light of another wavelength. Hence, in embodiments the beam modifying element comprises a luminescent material configured to convert at least part of the light source light into luminescent material light.

The beam modifying element may include one or more structures, like a 3D printed layer, 3D printed spots, 3D printed lines, 3D printed areas, etc. etc.

The reflector cavity exit side may have a reflector cavity exit area. Especially, the area of the reflector cavity exit window that may be covered with the beam modifying element is smaller than the (total) reflector cavity exit area. Especially, in the range of 1-80%, such as 1-50%, especially 2-40%, such as 5-20%, of the reflector cavity exit window may be occupied with the beam modifying element. As indicated above, the term "beam modifying element" may also refer to a plurality of beam modifying elements. The indicated area percentage refers to the total area occupied by the beam modifying element(s). Hence, at least part of the beam of light generated by the light source and reflector cavity may be transmitted through the reflector cavity exit window substantially non-modified by the beam modifier.

Except for the (3D printed) beam modifier, there may optionally be a second beam modifier or second beam modifying element, which may be comprised by the first window side and/or the second window side of the window. Optionally, the second window side may include one or more second beam shaping elements. For instance, the second window side may include one or more of prismatic structures, a Fresnel lens, etc. etc. Hence, in embodiments one or more of the first window side and the second window side comprises a second beam shaping element. Especially, only the second window side may include such optional second beam shaping elements or none of the window sides include such second beam shaping elements. These second beam shaping elements are non-3D printed. For instance, a foil comprising second beam shaping elements may be applied to the second window side.

The second beam modifier may amongst others include micro optical elements, such as elements having a height and/or other dimensions in the range of up to 50 µm, such as in the range of 1-40 µm, like in the range of 5-20 µm. Hence, these dimensions may apply to one or more of height, width, length and pitch, especially at least the height and one or more of the length and the width. Would such micro optical structures, like prismatic structures or Fresnel lenses, be available at the first window side, the 3D printer can print on these structures as with such small elements, the first window side is substantially flat for the filaments which may be at least 100 µm, or even at least 200 µm thick, such as in the range of 0.1-1 mm.

Of course, the lighting device may include further optics, configured downstream from the window.

As indicated above, the transmissive window is configured as reflector cavity exit window. However, the transmissive window is also the support on which the lighting device, or more especially the beam modifying element and the reflector cavity are 3D printed.

Within the next 10-20 years, digital fabrication will increasingly transform the nature of global manufacturing. One of the aspects of digital fabrication is 3D printing. Currently many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerisable material which is cured after each deposition to form a solid structure. While this technique produces smooth surfaces the photo curable materials are not very stable and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Another term for FDM is "fused filament fabrication" (FFF). Herein, the term "filament 3D printing" (FDP) is applied, which is considered to be equivalent to FDM or FFF. In general, FDM printers use a thermoplastic filament, which is heated to (or above) its melting point and then extruded, layer by layer, (or in fact filament after filament) to create a three dimensional object. FDM printers are relatively fast and can be used for printing complicated objects.

Hence, in an aspect the invention provides a method of producing a lighting device, the method comprising (a) providing a light transmissive window having a first window side and a second window side; (b) 3D printing a reflector cavity wall comprises a light reflective material to the first window side, to provide a reflector cavity, the reflector cavity comprising a first reflector cavity side, a reflector cavity exit side, said reflector cavity wall bridging said first reflector cavity side, and said reflector cavity exit side; and 3D printing a beam modifying element at the first window side, to provide said beam modifying element within the reflector cavity; and (c) providing a light source at the first reflector cavity side, the first light source configured to provide light source light within said reflector cavity.

A very good 3D printing method for the present purpose is the FDM printing method. Hence, in embodiments the method comprises fused deposition modeling 3D printing the reflector cavity wall and/or fused deposition modeling 3D printing the beam modifying element. Hence, especially in embodiments the reflector cavity wall comprises a fused deposition modeling 3D printed cavity wall and/or the beam modifying element comprises a fused deposition modeling 3D printed beam modifying element.

The reflector cavity wall and beam modifying element may be printed one after the other, wherein then in general first the beam modifying element is printed. However, when using a 3D printer with a plurality of printing heads, the reflector cavity wall and beam modifying element may also be printed substantially simultaneously, i.e. both are built up layer by layer. Note that the beam modifying element will in general only occupy a relatively small volume of the cavity, such as equal to or less than 10 vol. % of the cavity, especially equal to or less than 10 vol. % of the cavity, such as equal to or less than 2 vol. % of the cavity, for instance, about 0.001 vol. % or more, like at least 0.01 vol. %.

The reflector cavity wall and beam modifying element may essentially be comprised of polymeric material. Polymeric material may be melted to or above the melting point and in this way printed on the support or 3D printed item under construction.

The polymeric material before printing may be indicated as "printable material" or "3D printable material" and the polymeric material after printing may be indicated as printed material or "3D printed material". The 3D printable material will be heated by the 3D printer before it leaves the nozzle to a temperature of at least the glass transition temperature, and in general at least the melting temperature. Herein the term "polymer" may refer to a homopolymer or a heteropolymer. Further, the term "polymer" may herein refer to one or more of alternating copolymers, periodic copolymers, block copolymers, grafted co-polymers, etc. The term "polymer" may refer to a branched polymer or to an unbranched polymer. Yet further, the term "polymer" may refer to an aromatic polymer or an aliphatic polymer, etc.

In specific embodiments, the first polymer comprises one or more polymers selected from the group consisting of polyesters, such as polyethylene terephthalate (PET), polybutylene terephthalate (PBT), polyethylene naphthalene (PEN) and their copolymers, polyphenylene sulfide (PPS), Syndotactic polystyrene (sPS), etc. In other embodiments, the first polymer comprises one or more polymers selected from the group consisting of a polyester, a polyethylene, a polyphenylene, and a polystyrene, etc. In yet further embodiments, the first polymer comprises one or more polymers selected from the group consisting of polyethylene terephthalate (PET), polybutylene terephthalate (PBT). Especially suitable seems polyethylene terephthalate. Hence, in a more specific embodiment, the first polymer comprises polyethylene terephthalate (PET). Further, the first polymer may include a copolymers of one or more the afore-mentioned polymers. In embodiments, one or more of PLA (polylactic acid), ABS, PET and PC may be applied. Further, as indicated above, the polymeric material may especially further comprise an inorganic and/or organic (white) pigment (reflective additive).

Hence, polymeric material is applied that is printable.

Further, the polymeric material may comprise a light reflective additive, as also indicated above, especially for the cavity wall. Alternatively or additionally, the polymeric material may include one or more of a pigment (herein also indicated as colorant) and a luminescent material, especially for the beam modifying element.

Especially, the additive—when available, is available in a an amount of at maximum 10 wt. %, such as at maximum 8 wt. %, like at maximum 6 wt. %, relative to the total weight of the polymeric material. When the additive comprises a colorant, the content may be less than 1 wt. %, such as 0.001-0.1 wt. %. Therefore, when a reflective additive is applied, the mass fraction thereof is especially at maximum 10%, such as at maximum 6%, like in the range of 0.001-1%, such as 0.01-1%, with the remainder especially being polymeric material. The polymeric material is especially a thermoplastic material. The additive may comprise one or more of an organic additive and an inorganic additive. Especially, the additive comprises an inorganic additive. Alternatively or additionally, the additive may comprise an organic dye.

As indicated above, for facilitating the 3D printing process, it may be helpful when the support is planar. Hence, in embodiments the first window side is planar.

With the herein described method, it may also be possible to print a material that is similar or even (substantially) identical to the window material. For instance, the window material may be PET and the printable material, for one or more of the beam modifying element and the cavity wall, may also be PET.

Hence, in yet further embodiments the window material and the reflector cavity wall material comprise the same polymeric material. For instance, the weight percentage of polymeric material substantially being identical may be at least 80 wt. %, such as at least 85 wt. %, like at least 90 wt. %. For instance, assuming the window comprising 100% PET, the reflector cavity wall material comprising 95 wt. % PET, then 95 wt. % of the material is identical. When using similar or identical printable materials, adhesion between parts may be improved.

Alternatively or additionally, the beam modifying element comprises a beam modifying element material, and the window material and the beam modifying element material comprise the same polymeric material. For instance, the weight percentage of polymeric material substantially being identical may be at least 80 wt. %, such as at least 85 wt. %, like at least 90 wt. %. For instance, assuming the window comprising 100% PET, the beam modifying element material comprising 98 wt. % PET, then 98 wt. % of the material is identical. When using similar or identical printable materials, adhesion between parts may be improved.

Especially, the window is (thus) a non-3D printed item. The window may e.g. be obtainable with extrusion, injection molding, etc. etc. Therefore, in specific embodiments the first window is a non-3D printed first window, wherein the first window comprises a window material, wherein the reflector cavity wall comprises a reflector cavity wall material, and wherein the window material and the reflector cavity wall material comprise the same polymeric material.

The reflector cavity is produced with a first open cavity side. Upstream thereof, partly therein, or therein the light source may be arranged. For instance, a unit comprising the light source may be screwed in an opening at the first cavity side. With the 3D printing process, also a thread may be printed. The light source may be arranged on a support, such as a printed circuit board.

Preceding the printing stage, first a design stage may be executed. This may imply defining based on desired lighting properties in a specific space a specific lighting device for such space.

The term space may for instance relate to a (part of) hospitality area, such as a restaurant, a hotel, a clinic, or a hospital, etc. The term "space" may also relate to (a part of) an office, a department store, a warehouse, a cinema, a church, a theatre, a library, etc. However, the term "space" also relate to (a part of) a working space in a vehicle, such as a cabin of a truck, a cabin of an air plane, a cabin of a vessel (ship), a cabin of a car, a cabin of a crane, a cabin of an engineering vehicle like a tractor, etc. The term "space" may also relate to (a part of) a working space, such as an office, a (production) plant, a power plant (like a nuclear power plant, a gas power plant, a coal power plant, etc.), etc. For instance, the term "space" may also relate to a control room, a security room, etc.

Hence, in embodiments the method may also include defining one or more lighting parameters for a space and producing the lighting device in dependence of the one or more lighting parameters.

A computer program product may be provided that is enabled to carry out one or more stages of the method as defined herein, for instance when loaded on a computer, including e.g. a smartphone, an iPhone, a laptop, etc. etc. In yet a further aspect, the invention provides a record carrier (or data carrier, such as a USB stick, a CD, etc.) storing such computer program product. Hence, the computer program product, when running on a computer or loaded into a computer, brings about, or is capable of bringing about, the method as described herein. The method may include taking one or more pictures with a camera of a portable device of the space wherein the lighting device will have to be used, and based thereon define the properties of the lighting device, including the shape and dimensions of the cavity wall and/or the shape and dimensions of the beam modifying element. Optionally, the computer program product may further include a purchase module, whereby the (custom) designed lighting device may be ordered.

Amongst others, the invention may be used for both indoor and outdoor LED illumination systems.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 4a-5d schematically depict some embodiments and light distributions obtainable therewith.

The schematic drawings are not necessarily to scale.

DETAILED DESCRIPTION OF THE EMBODIMENTS 3D printing of e.g. downlights offers unique design and customization opportunities. One may design almost free-form intensity profiles and create a look and feel with fits to the unique architecture of a new or refurbished building. It also offers opportunities for retrofitting existing lighting systems (i.e. systems based on TL or other conventional light source). This means that is possible to reproduce the intensity profile of a conventional luminaire exactly by a 3D printed lighting system. This invention describes a process to fabricate tailor-made lighting devices, such as downlights. The described technology and embodiments are not limited to downlights but can be applied to e.g. office lighting and high-bay lighting as well. The invention focuses on Fused Deposition Modelling (FDM) which is also called Fused Filament Fabrication (FFF).

Figure 1:
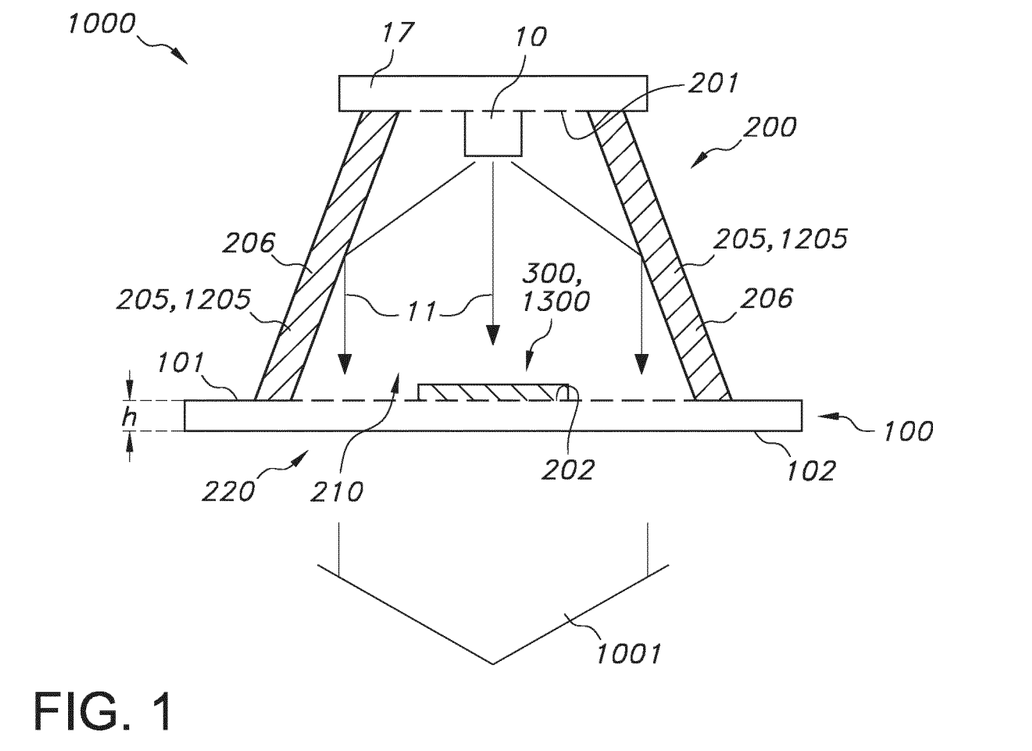
FIG. 1 schematically depicts an embodiment of the lighting device as described herein.

FIG. 1 schematically depicts an embodiment of a lighting device 1000 configured to provide a beam of lighting device light 1001. The lighting device 1000 comprises a light transmissive window 100, a reflector 200, a light source 10, and a beam modifying element 300.

The light transmissive window 100 has a first window side 101 and a second window side 102.

The reflector 200 comprises a reflector cavity 210. The reflector cavity 210 comprises a first reflector cavity side 201, a reflector cavity exit side 202, a reflector cavity wall 205 bridging said first reflector cavity side 201 and said reflector cavity exit side 202. The reflector cavity wall 205 comprises a light reflective material 206. The reflector cavity wall 205 comprises a 3D-printed cavity wall 1205. Further, at least part of the first window side 101 is configured as reflector cavity exit window 220 at the reflector cavity exit side 202.

The light source 10 is configured at the first reflector cavity side 201 and configured to provide light source light 11 within said reflector cavity 210. In this way a beam may be shaped with the reflector 200. The beam modifying element 300 is configured at the first window side 101 within the reflector cavity 210. Further, the beam modifying element 300 comprises a 3D-printed beam modifying element 1300.

Reference 17 indicates a support for the light source 10, such as a PCB. Reference h indicates the height of the window 100, such as 1-5 mm.

Here, first reflector cavity side 201 and said reflector cavity exit side 202 are indicated with dashed lines, as these side are in the schematically depicted embodiment(s) closed with the support 17 and window 200, respectively. In the schematically depicted embodiment, one side of the support 17 and the first reflector cavity side 201 substantially coincide in the drawing (over the length of the first reflector cavity side 201); the second reflector cavity side 202 and the first window side 101 substantially coincide in the drawing (over the length of the second reflector cavity side 202).

Here, the reflector cavity 210 may substantially be symmetric. Dependent upon the configuration of the beam modifying element 300, the beam of lighting device light 1001 may be symmetric or asymmetric.

Figure 2A:
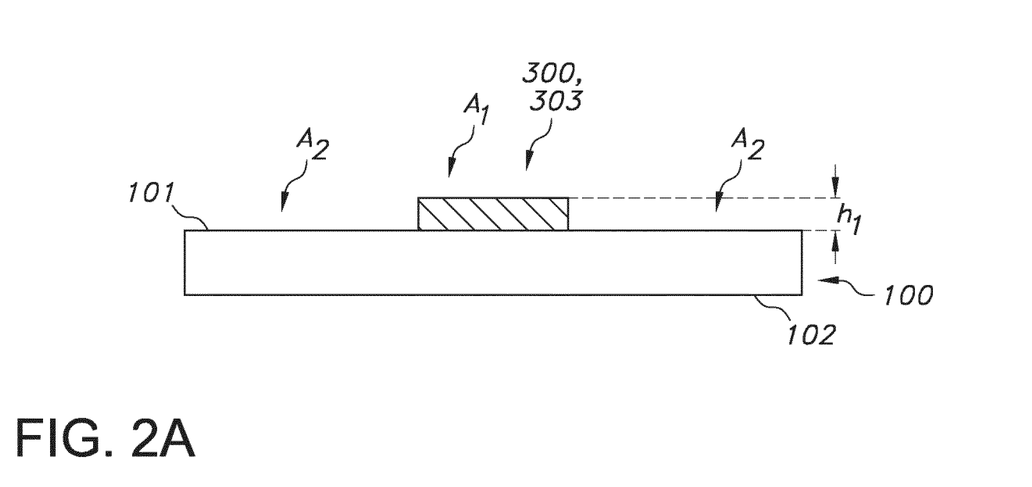
FIGS. 2a-2d schematically depict some variants.
Figure 2B:
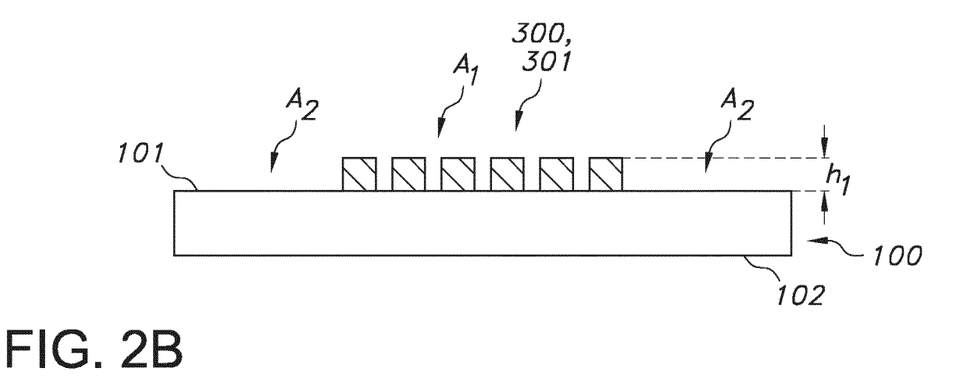
Figure 3A:
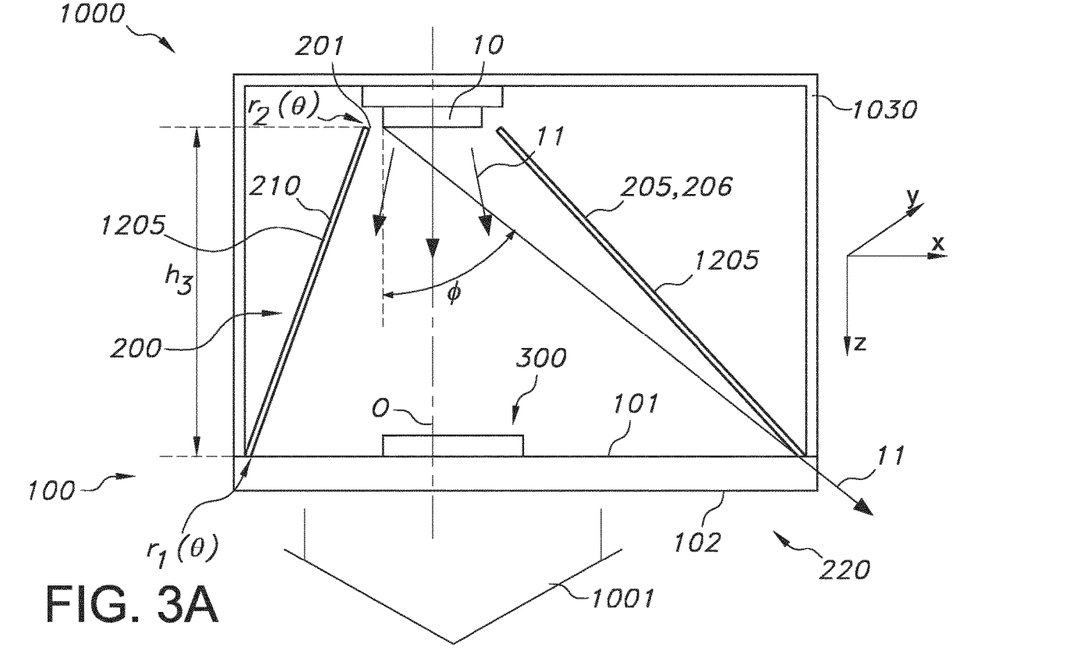
FIGS. 3a-3c schematically depict some further aspects.
Figure 3B:
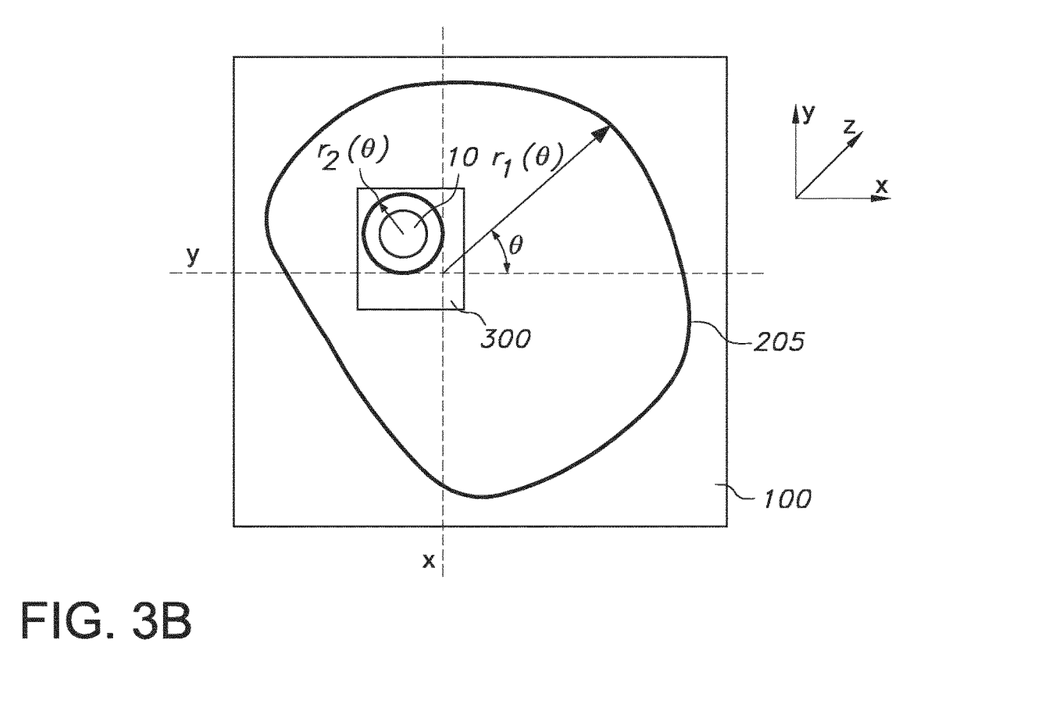

FIGS. 2a-2b schematically depict two non-limiting variants of the beam modifying element 300, with in FIG. 3a a beam modifying element 300 substantially consisting of a single piece (such as a single layer), and in FIG. 3b a beam modifying element 300 substantially consisting of a plurality of pieces, such as dots or lines. In both embodiments, the beam modifying element 300 is configured at the first window side. The beam modifying element 300 occupies a first area A1. The remaining area is indicated with reference A2. In FIG. 2a, the area A1 is about 30% of the total area A1+A2, i.e. the total area of the first window side within the cavity. FIG. 2a may e.g. show a glare reduction element 303 as beam modifying element 300. FIG. 2b may e.g. schematically depict a beam shaping element as beam modifying element 300. Note that in fact in general each element configured within the beam will have a beam modifying effect. The height of the beam modifying element 300 is indicated with reference h1, and may especially be in the range of at least 100 µm, such as in the range of 200 µm-10 mm, such as 500 µm-5 mm.

Figure 2C:
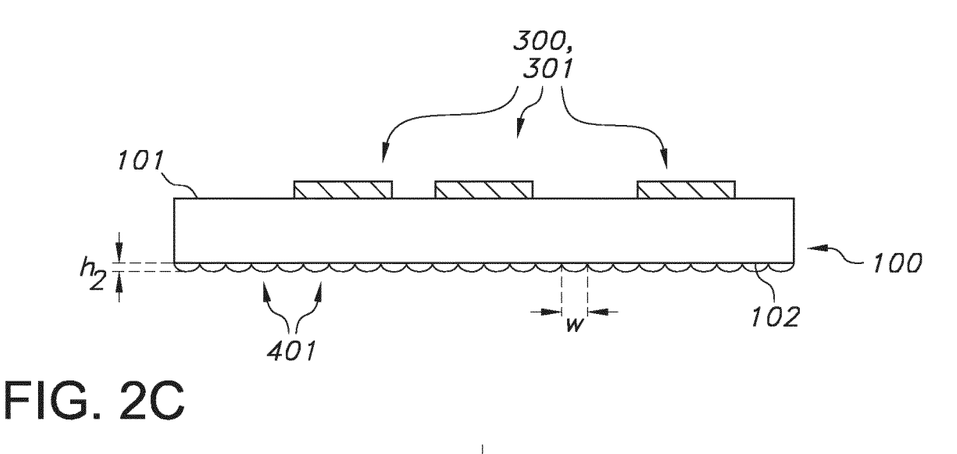

FIG. 2c schematically depicts an embodiment of the beam modifying element 300 wherein the beam modifying element 300 is configured non-symmetrical. Further, by way of example a second beam shaping element 401 is depicted, here a plurality of second beam shaping elements 401, such as a Fresnel lens. This second beam shaping element 401 is not limited to the specific embodiment of the non-symmetrically configured beam modifying element 300. The non-symmetrically configured beam modifying element 300 is not necessarily combined with the second beam shaping element; also other embodiments may include such second beam shaping element. Further, here by way of example the second beam shaping element is configured at the second side of the window, i.e. the downstream side. Note that the second beam shaping element 401 may optionally also configured at the first window side 101, especially when the second beam shaping element 401 includes micro-optical structures having heights h2 of at maximum 50 µm, and widths 2 of at maximum 50 µm.

Figure 2D:
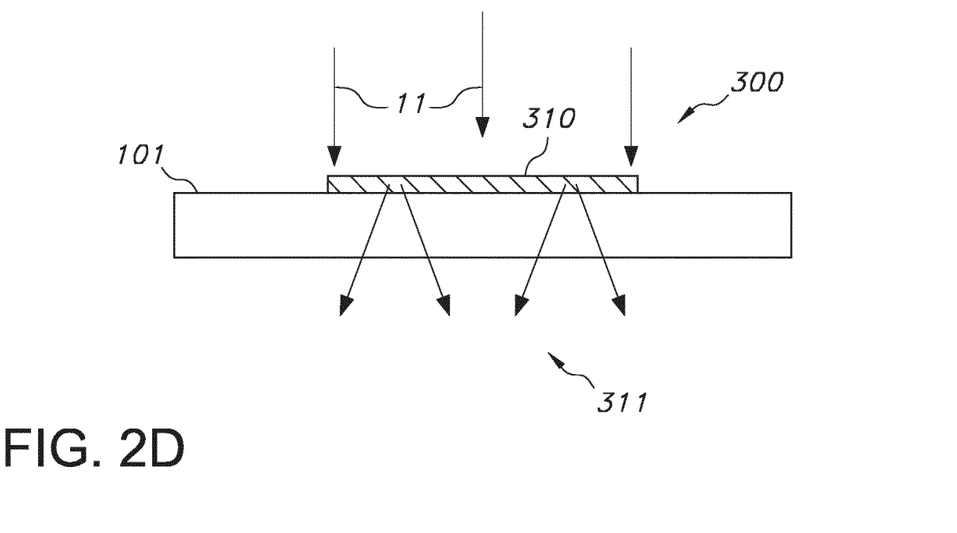

FIG. 2d schematically depicts a luminescent material 310 comprising beam modifying element 300. At least part of the light source light 11 may be converted into luminescent material light 311.

Figure 3C:
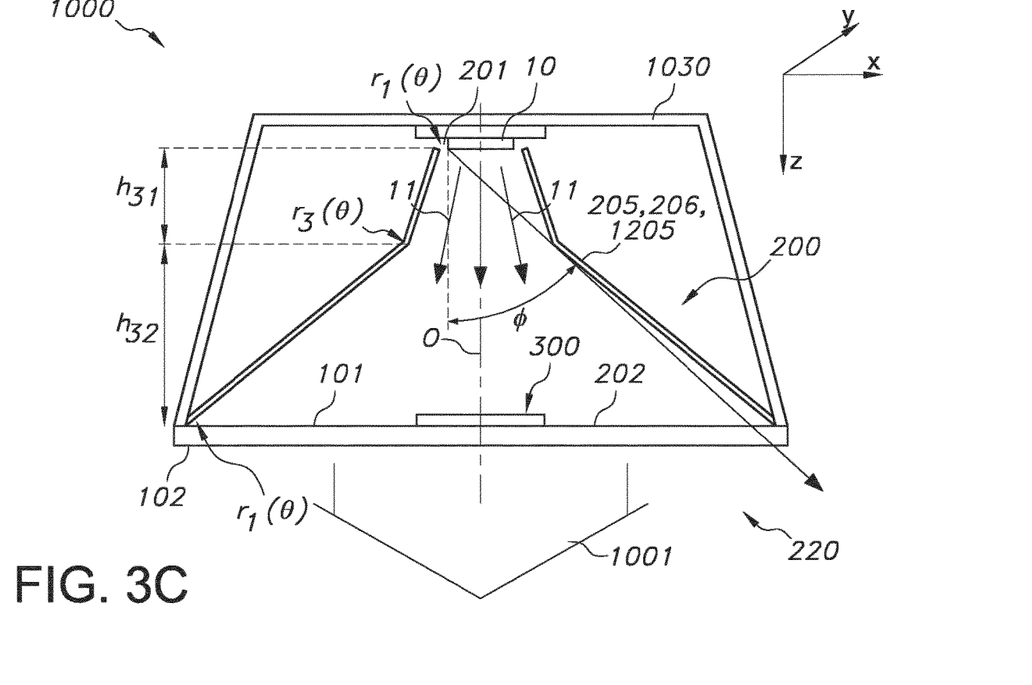

The following features may e.g. be applied:

(1) A flat, rigid transparent optical plate (PMMA, polycarbonate, glass) of arbitrary shape. The plate is optionally provided with optical (micro) structures and/or textures on one or both sides of the plate. A typical thickness range of the plate is 1-5 mm. 3D printing (FDM) may give rise to artefacts not present in conventional products. A light texture present on the front plate prevents direct view in the reflector;

(2) At least one hollow structure (white, diffuse material) is 3D printed on one side of the optical plate, mentioned in (1). The hollow structure has an exit surface and an entrance surface characterized by a closed curve $r_1(\theta)$ and $r_2(\theta)$ respectively. The 3D hollow structure is formed by a straight wall (height h above the optical plate) connecting the two closed curves $r_1(\theta)$ and $r_2(\theta)$. Both curves can e.g. be described e.g. by a superellipse (see below) or by the "superformula". The complete reflector can be characterized by $r_1(\theta)$, $r_2(\theta)$ and h. The center of $r_1(\theta)$ may also be shifted w.r.t. the center of $r_2(\theta)$. Even more design freedom is created when an extra closed curve $r_3(\theta)$ is introduced (FIG. 3c).

(3) An optical structure is printed on part of the transparent optical plate, preferably on the same side where the white, hollow structure is printed. The printed structure(s) are located within the contour given by the function $r_1(\theta)$. The printed structures can be of a white, diffuse material or a transparent polymeric material (PET, PC, PMMA);

(4) A single solid state light source, especially an LED (e.g. Chip On Board; COB) or cluster of LEDs is placed at the entrance of the hollow structure.

FIG. 3a schematically depicts an embodiment. Reference 1030 indicates a housing substantially enclosing the light source 10 and the reflector 200. The first side 201 of the reflector cavity 210 of the reflector 200 can be described with $r2(\theta)$. The second side 202 of the reflector cavity 210 can be described with $r1(\theta)$. FIG. 3a shows a cross-sectional view of the lighting device 1000. The height, defined as the distance between the light source 10 (more especially its exit window) and the exit window of the reflector 200, i.e. the second side 202, is indicated with reference h3.

FIG. 3b schematically depicts a top view of an embodiment of the lighting device.

FIG. 3c schematically depicts yet a further embodiment of the lighting device 1000, now with an extra feature: an extra closed curve indicated and described with $r3(\theta)$.

Beam shaping can be done when a LED (cluster) is placed in a tapered enclosure defined by an entrance area and an exit area. The enclosure is especially made from a white, highly reflecting material (matte or high gloss finish). The cut-off is determined by the angle φ as indicated in FIGS. 3a and 3c. The cut off angle φ may vary as a function of θ. The sharpest cut-off is created when the entrance surface area is small compared to the exit area. By playing with height (h31 and h32) and the functions $r_1(\phi), r_2(\phi) \ldots r_n(\phi)$, an optimized beam can be defined fulfilling all glare regulations (e.g. Unified Glare Rating; UGR). In addition to creating a cut off in all directions, the beam shape could also be fine-tuned (especially at intensities around φ=0 deg.). This can be done by printing a suitable structure on part of the optical plate. This print can have an arbitrary shaped footprint (which can also be defined by a function r(φ)). The beam shaping structure can be made of white, diffuse material (similar to the reflector) or a clear material (e.g. PC or PET).

It appears that a "high gloss", white reflector material gives the sharpest cut off and the lowest glare.

The so-called "superellipse" may be described parametrically by $$x = A|\cos(t)|^{2/n} * \left[\frac{-\cos(t)}{|\cos(t)|}\right]$$

$$y = B|\sin(t)|^{2/n} * \left[\frac{-\sin(t)}{|\sin(t)|}\right]$$

The radius $r$ is therefore $$r(t) = \sqrt{x^2 + y^2}$$

$$0 < t < 2\pi$$

Figure 4A:
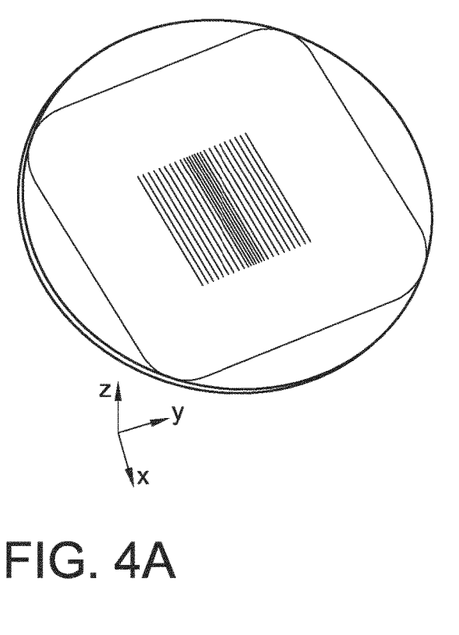
Figure 4B:
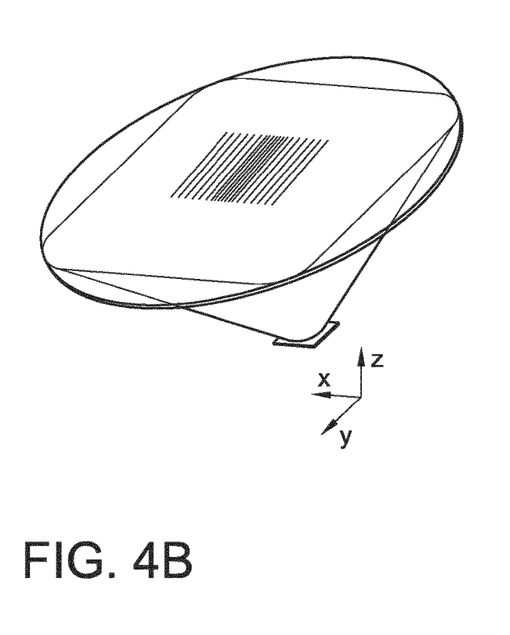
Figure 4C:
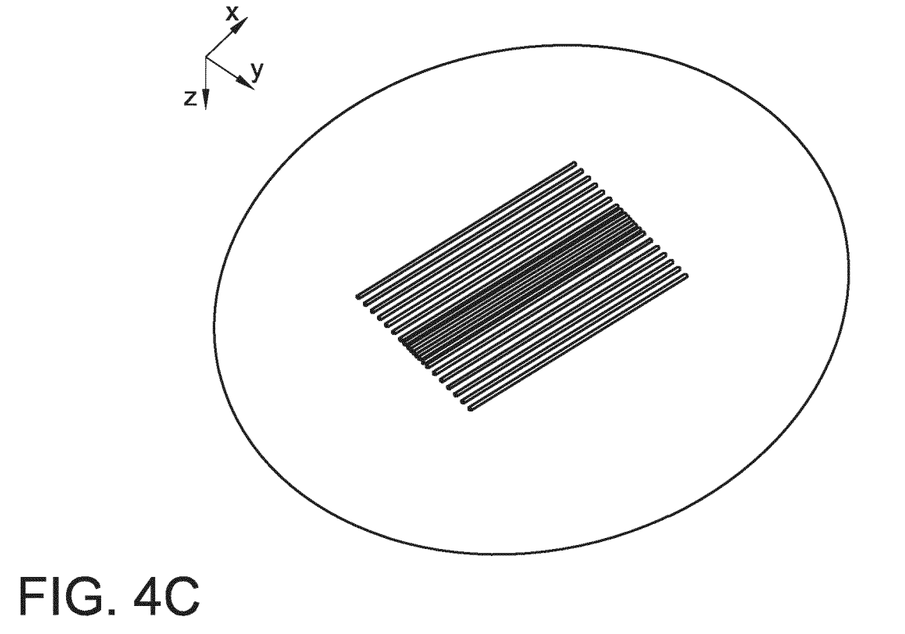
Figure 4D:
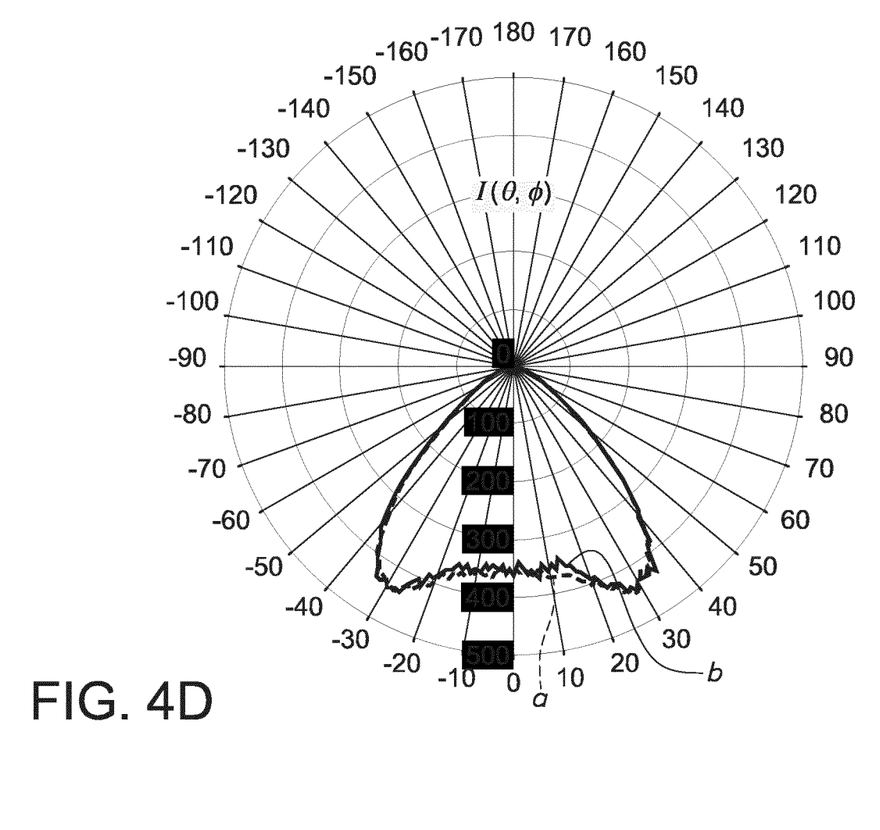

FIGS. 4a-4d schematically depict a variant (FIGS. 4a-4c) and the light distribution obtained therewith. FIG. 4a is a front view, FIG. 4b is a side view, with at the bottom a light source, such as a COB (chip on board), and FIG. 4c schematically depicts a front plate having a 3D-printed beam modifying element which here comprises a plurality of white lines on the inside (i.e. directed towards the light source). The light distribution, with reduced glare, is shown in FIG. 4d.

In FIGS. 4a-4c a lighting device is defined using the following features:
(1) r1(φ) is defined by a superellipse (see appendix). Parameters: n=5, A=B=60 mm
(2) r2(φ) is a circle with a radius of 7.5 mm
(3) h=60 mm
(4) A Luxeon COB 1203 (Lumileds) is used, which has a light emitting surface of 9 mm diameter (flux=1200 lm)
(5) Texture is applied on the outside of the optical front plate (PMMA). The texture scatters light according to a Gaussian light distribution (σ=5 deg.)
(6) The square beam shaping structure measures 35 mm×35 mm and consists of printed, white stripes on the inside of the optical plate. The stripes have a width of 0.5 mm and a height of 1 mm. The stripes have a pitch which is not constant over the area. The material used is a $TiO_2$ pigment filled PMMA.

An intensity profile $I(\theta,\phi)$ was calculated using the parameters defined above. The two intensity profiles in FIG. 4d correspond to the intensity profile in the x-z plane (curve a) and y-z plane (curve b) respectively. A desired "delta shaped" beam is obtained, creating a high illumination uniformity. The UGR value was 22.1 for this particular flux and exit area.

Figure 5A:
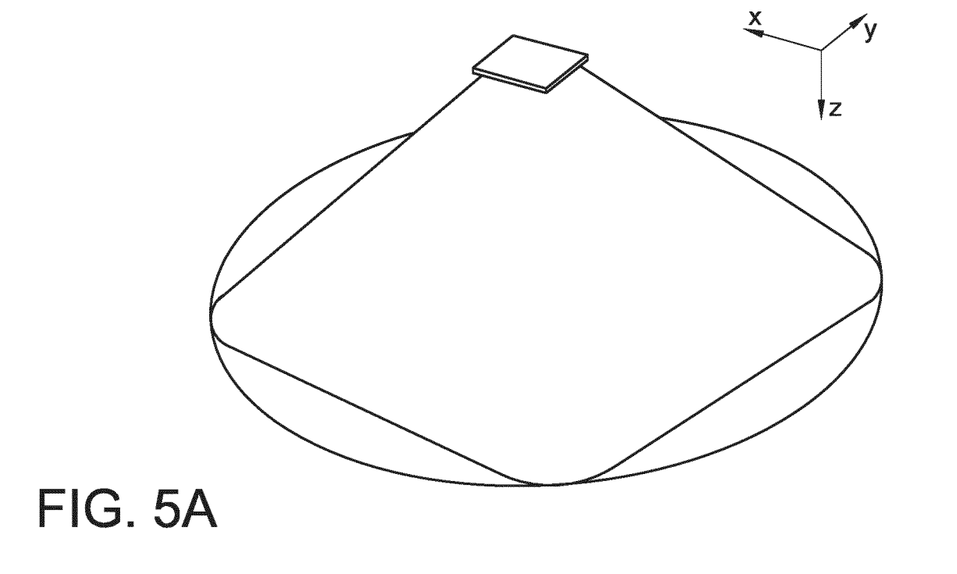
Figure 5B:
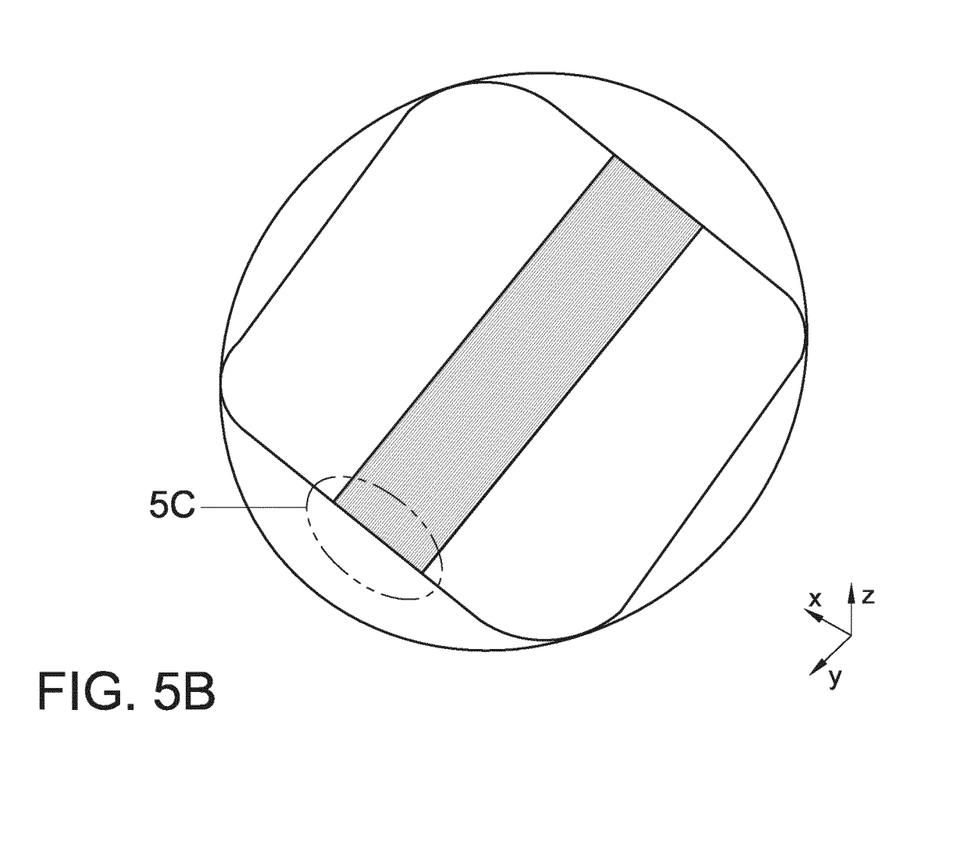
Figure 5C:
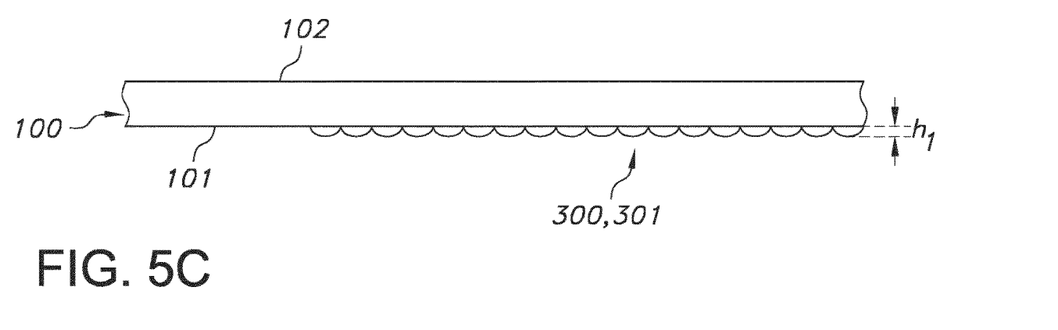
Figure 5D:
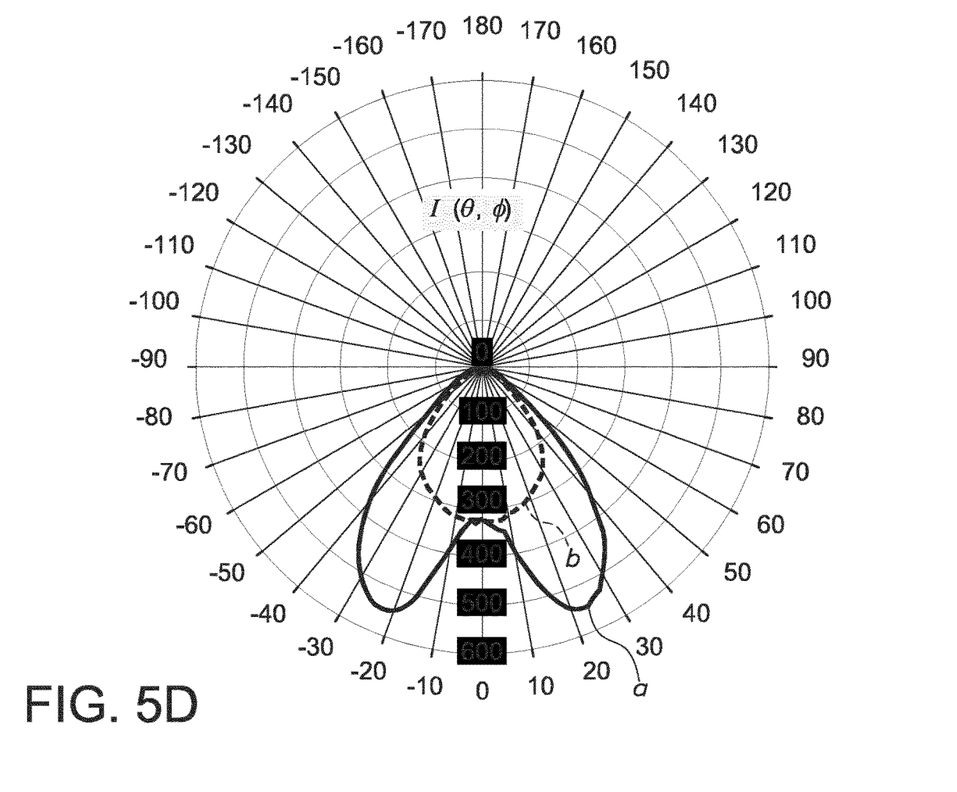

FIGS. 5a-5d schematically depict a variant (FIGS. 5a-5c) and the light distribution obtained therewith. FIG. 5a is a side view, with at the top a light source, such as a COB, FIG. 5b is a front view, and FIG. 5d schematically depicts a front plate or window in cross-section—having lenticular structures 3D printed on the inside of the window (i.e. directed towards the light source). The width of the lenticular structures is 1 mm, the curvature (1/R)=2, and the height is 0.2 mm. The lenticular structures are elongated in the y-direction. The light distribution, with reduced glare, is shown in FIG. 5d.

In FIGS. 5a-5c a lighting system is defined using the following parameters:
(1) r1(φ) is defined as a superellipse (see appendix). Parameters: n=5, A=B=60 mm
(2) r2(φ) is a circle with a radius of 7.5 mm
(3) h=60 mm
(4) A Luxeon COB 1203 (Lumileds) is used having a light emitting surface of 9 mm diameter (flux=1200 lm)
(5) Texture is applied on the outside of the optical front plate (PMMA). The texture scatters light according to a Gaussian light distribution (σ=5 deg.)
(6) The square beam shaping structure measures 30 mm×120 mm and consists of printed clear material (PMMA). The structure of the print is explained in FIGS. 5a-5c.

An intensity profile $I(\theta,\phi)$ was calculated using the parameters defined above. The two-lobbed larger curve and the smaller distorted-circular curve in FIG. 5d are the intensity profiles corresponding to the intensity profile in the x-z plane (curve a) and y-z plane (curve b) respectively. Printed patterns of a clear material will lead to highly efficient systems.

Figure 6:
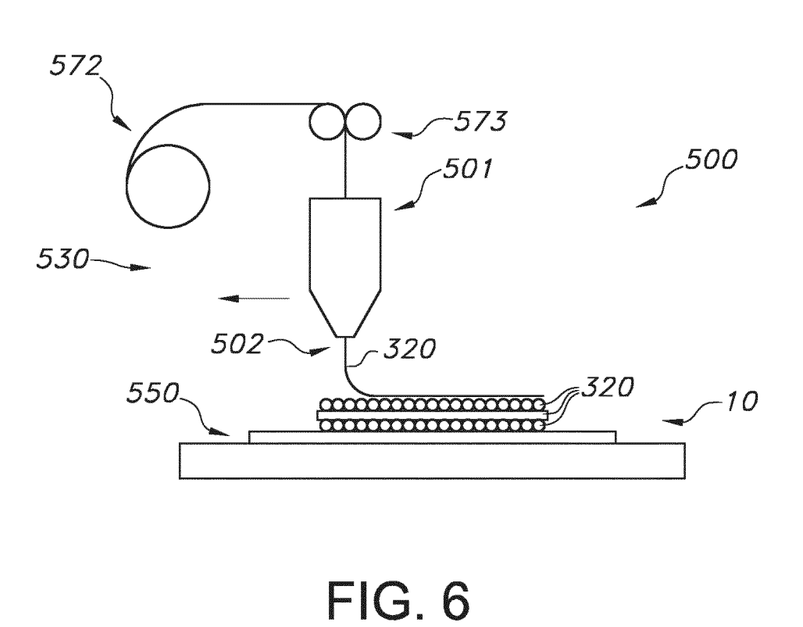
FIG. 6 schematically depicts an embodiment of a 3D printer that may be used in the herein described method for producing the lighting device.

FIG. 6 schematically depict some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as a FDM 3D printer head is schematically depicted. Reference 501 indicates the printer head. The 3D printer of the present invention may especially include a plurality of printer heads, though other embodiments are also possible. Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention. The 3D printer 500 is configured to generate a 3D item 10 by depositing on a receiver item 550 a plurality of filaments 320 wherein each filament 20 comprises 3D printable material, such as having a melting point $T_m$. The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). Reference 572 indicates a spool with material, especially in the form of a wire. The 3D printer 500 transforms this in a filament or fiber 320. Arranging filament by filament and filament on filament, an intermediate 3D item 110 may be formed.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A method of producing a lighting device, the method comprising:

providing a light transmissive window having a first window side and a second window side;

3D printing a reflector cavity comprising a light reflective material to the first window side, to provide a reflector cavity, the reflector cavity comprising a first reflector cavity side, a reflector cavity exit side a reflector cavity wall bridging said first reflector cavity side and said reflector cavity exit side; and 3D printing a beam modifying element at the first window side, to provide said beam modifying element within the reflector cavity; and providing a light source at the first reflector cavity side, the light source being configured to provide light source light, within said reflector cavity.

2. The method according to claim 1, further comprising fused deposition modeling 3D printing the reflector cavity wall and fused deposition modeling 3D printing the beam modifying element.

3. The method according to claim 1, wherein the first window side is substantially planar.

4. The method according to claim 1, wherein the first window is a non-3D printed first window, wherein the first window comprises a window material, wherein the reflector cavity wall comprises a reflector cavity wall material, and wherein the window material and the reflector cavity wall material comprise the same polymeric material.

5. The method according to claim 1, further comprising the steps of defining one or more lighting parameters for a space and producing the lighting device in dependence of the one or more lighting parameters.

6. The method according to claim 1, wherein the beam modifying element comprises a beam shaping element.

7. The method according to claim 1, wherein the beam modifying element comprises a glare reduction element.

8. The method according to claim 1, wherein the beam modifying element comprises a luminescent material configured to convert at least part of the light source light into luminescent material light.

9. The method according to claim 1, wherein the light source comprises a solid state light source.

10. The method according to claim 1, wherein the reflector cavity has equal to or less than one symmetry plane.

* * * * *